US012746797B2

(12) United States Patent
Li et al.

(10) Patent No.: US 12,746,797 B2
(45) Date of Patent: Sep. 29, 2026

(54) VALVE SET INTEGRATED MODULE, THERMAL MANAGEMENT SYSTEM, AND VEHICLE

(71) Applicant: BYD COMPANY LIMITED, Shenzhen (CN)

(72) Inventors: Shibai Li, Shenzhen (CN); Wei Jin, Shenzhen (CN); Min Xu, Shenzhen (CN); Meijiao Ye, Shenzhen (CN); Yuzhong Li, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 298 days.

(21) Appl. No.: 18/478,159

(22) Filed: Sep. 29, 2023

(65) Prior Publication Data

US 2024/0025227 A1 Jan. 25, 2024

Related U.S. Application Data

(63) Continuation of application No. PCT/CN2022/095514, filed on May 27, 2022.

(30) Foreign Application Priority Data

May 31, 2021 (CN) ......................... 202110603393.5

(51) Int. Cl.
*B60H 1/00* (2006.01)

(52) U.S. Cl.
CPC ..... *B60H 1/00485* (2013.01); *B60H 1/00557* (2013.01); *B60H 1/00885* (2013.01)

(58) Field of Classification Search
CPC . B60H 1/00485; B60H 1/00885; F25B 41/20; F25B 41/31; F25B 41/34; F25B 41/345
See application file for complete search history.

(56) References Cited

FOREIGN PATENT DOCUMENTS

| | | | |
|---|---|---|---|
| CN | 104976398 | A | 10/2015 |
| CN | 205980092 | U | 2/2017 |
| CN | 111038216 | A | 4/2020 |
| CN | 111976416 | A | 11/2020 |

(Continued)

OTHER PUBLICATIONS

JP 2021-47000 (English translation) (Year: 2021).*
English Translation International Search Report from PCT/CN2022/095514 dated Aug. 23, 2022 (3 pages).

*Primary Examiner* — Jonathan Bradford
(74) *Attorney, Agent, or Firm* — Calfee, Halter & Griswold LLP

(57) ABSTRACT

A valve set integrated module, a thermal management system, and a vehicle are provided. The valve set integrated module includes a body, a first electric valve, and a second electric valve. The body is provided with multiple internal flow channels and multiple interfaces configured to communicate the internal flow channels with an external heat exchange assembly of the thermal management system. The first electric valve and the second electric valve are arranged on the body and configured to communicate parts of the multiple internal flow channels to form multiple different thermal management circuits. The first electric valve and the second electric valve are configured to unblock/block and/or throttle the thermal management circuits to achieve at least one of the multiple preset thermal management modes.

20 Claims, 13 Drawing Sheets

(56) References Cited

FOREIGN PATENT DOCUMENTS

| | | | |
|---|---|---|---|
| CN | 112432396 | A | 3/2021 |
| CN | 113968114 | A | 1/2022 |
| CN | 216033602 | U | 3/2022 |
| JP | H0317477 | A | 1/1991 |
| JP | H1123071 | A | 1/1999 |
| JP | 2021047000 | A | 3/2021 |

* cited by examiner

VALVE SET INTEGRATED MODULE, THERMAL MANAGEMENT SYSTEM, AND VEHICLE

CROSS-REFERENCE TO RELATED APPLICATIONS

The present disclosure is a bypass continuation application of PCT International Application No. PCT/CN2022/095514, filed on May 27, 2022, which claims priority to Chinese Patent Application No. 202110603393.5, filed on May 31, 2021, and entitled "VALVE SET INTEGRATED MODULE, THERMAL MANAGEMENT SYSTEM, AND VEHICLE", which is incorporated herein by reference in their entireties.

FIELD

The present disclosure relates to the field of vehicle technologies, and specifically, to a valve set integrated module, a thermal management system, and a vehicle.

BACKGROUND

A thermal management system is an important part of a vehicle, which can change a temperature environment inside the vehicle so that a driver and passengers can obtain a good driving experience. A conventional thermal management system is configured with multiple valves with different functions according to functional requirements. Generally, multiple valves are independently mounted to a pipeline, which causes connection of a system pipeline complex and is not conducive to a vehicle platform design. In addition, most of the existing valves are electronic valves, and each of the electronic valves needs to be connected to an electrical wiring harness of the vehicle. Since each valve body is separately arranged, a cost of the vehicle wiring harness is relatively high. In the related art, although an integrated valve exists, an integration degree of the existing integrated valve is low, and occupied space is still relatively large.

SUMMARY

A first object of the present disclosure is to provide a valve set integrated module. The module integrates multiple valves, which is conducive to simplifying a structure of a vehicle thermal management system, reducing occupied space, and reducing a cost.

In order to achieve the above objective, the present disclosure provides a valve set integrated module, which is configured for a thermal management system having multiple preset thermal management modes. The module includes:

- a body, provided with multiple internal flow channels and multiple interfaces configured to communicate the internal flow channels with an external heat exchange assembly of the thermal management system; and
- a first electric valve and a second electric valve, arranged on the body and configured to communicate parts of the multiple internal flow channels to form multiple different thermal management circuits, where the first electric valve and the second electric valve are configured to unblock/block and/or throttle the thermal management circuits to achieve at least one of the multiple preset thermal management modes.

Optionally, the internal flow channel includes an internal flow channel and an external flow channel. The body includes a first portion and a second portion. The first portion has a first connecting surface. The second portion has a second connecting surface. The first connecting surface is hermetically connected with the second connecting surface; multiple internal flow channels are arranged inside the first portion; and at least one groove is arranged on the second connecting surface of the second portion, and the groove on the second connecting surface and the first connecting surface jointly define the external flow channel.

Optionally, the first electric valve is configured to unblock/block the different thermal management circuits. A first end of the first electric valve is in communication with a compressor interface. A second end of the first electric valve is selectively communicated with or blocked from an interior heat exchanger inlet interface or an interior condenser inlet interface. The second electric valve is configured to throttle the different thermal management circuits. A first end of the second electric valve is in communication with a liquid reservoir outlet interface. A second end of the second electric valve is selectively communicated with or blocked from an interior evaporator inlet interface or an exterior heat exchanger inlet interface.

Optionally, the valve set integrated module further includes a one-way valve arranged on the body. An inlet of the one-way valve is in communication with the exterior heat exchanger inlet interface. An outlet of the one-way valve is in communication with the second electric valve.

Optionally, the valve set integrated module further includes a first solenoid valve arranged on the body. A first end of the first solenoid valve is in communication with an exterior heat exchanger outlet interface. A second end of the first solenoid valve is in communication with a gas-liquid separator inlet interface.

Optionally, the first electric valve is configured to unblock/block and throttle the different thermal management circuits. A first end of the first electric valve is in communication with an interior condenser outlet interface. A second end of the first electric valve is in communication with the exterior heat exchanger inlet interface. The second electric valve is configured to unblock/block the different thermal management circuits. A first end of the second electric valve is in communication with the exterior heat exchanger outlet interface. A second end of the second electric valve is selectively communicated with the interior evaporator inlet interface or the gas-liquid separator inlet interface.

Optionally, the valve set integrated module further includes a first electronic expansion valve arranged on the body. A first end of the first electronic expansion valve is in communication with the second electric valve. A second end of the first electronic expansion valve is in communication with the interior evaporator inlet interface.

Optionally, the valve set integrated module further includes a second solenoid valve arranged on the body. A first end of the second solenoid valve is in communication between the interior condenser outlet interface and the first electric valve through a pipeline. A second end of the second solenoid valve is in communication between the second electric valve and the first electronic expansion valve through the pipeline.

Optionally, the valve set integrated module further includes a second electronic expansion valve arranged on the body. A first end of the second electronic expansion valve is in communication with the exterior heat exchanger outlet interface. A second end of the second electronic expansion valve is in communication with a battery pack heat exchanger inlet interface arranged on the body.

Optionally, the valve set integrated module further includes a battery pack heat exchanger arranged on the body. An inlet of the battery pack heat exchanger is in communication with the battery pack heat exchanger inlet interface. An outlet of the battery pack heat exchanger is connected with a gas-liquid separator.

A second object of the present disclosure is to provide a thermal management system. The system includes an external heat exchange assembly of the thermal management system and the valve set integrated module in any of the above. The external heat exchange assembly includes multiple of a compressor, an interior condenser, an exterior heat exchanger, an interior evaporator, a gas-liquid separator, a PTC air heater, a blower, and a PTC water heater.

A third object of the present disclosure is to provide a vehicle, including the thermal management system.

In the above technical solution, multiple internal flow channels are arranged inside the valve set integrated module body to replace the existing connecting pipeline, which is beneficial to simplify the design of the connecting pipeline in the thermal management system. From the perspective of lightweight, a design the body is provided with multiple internal flow channels and multiple valves integrated in the module is conducive to reducing an overall weight of the module and is conducive to a lightweight design of the vehicle. In addition, different interfaces arranged on the body communicate the internal flow channel with the heat exchange assembly of the external thermal management system to form multiple different thermal management circuits, and the first electric valve and the second electric valve integrated on the module control unblocking/blocking or throttling of the thermal management circuits, to realize multiple preset thermal management modes.

Other features and advantages of the present disclosure will be described in detail in the following detailed description part.

BRIEF DESCRIPTION OF THE DRAWINGS

The accompanying drawings are intended to provide further understanding of the present disclosure and constitute a part of this specification. The accompanying drawings and the specific implementations below are used together for explaining the present disclosure rather than constituting a limitation to the present disclosure. In the accompanying drawings.

DETAILED DESCRIPTION

Figure 1:
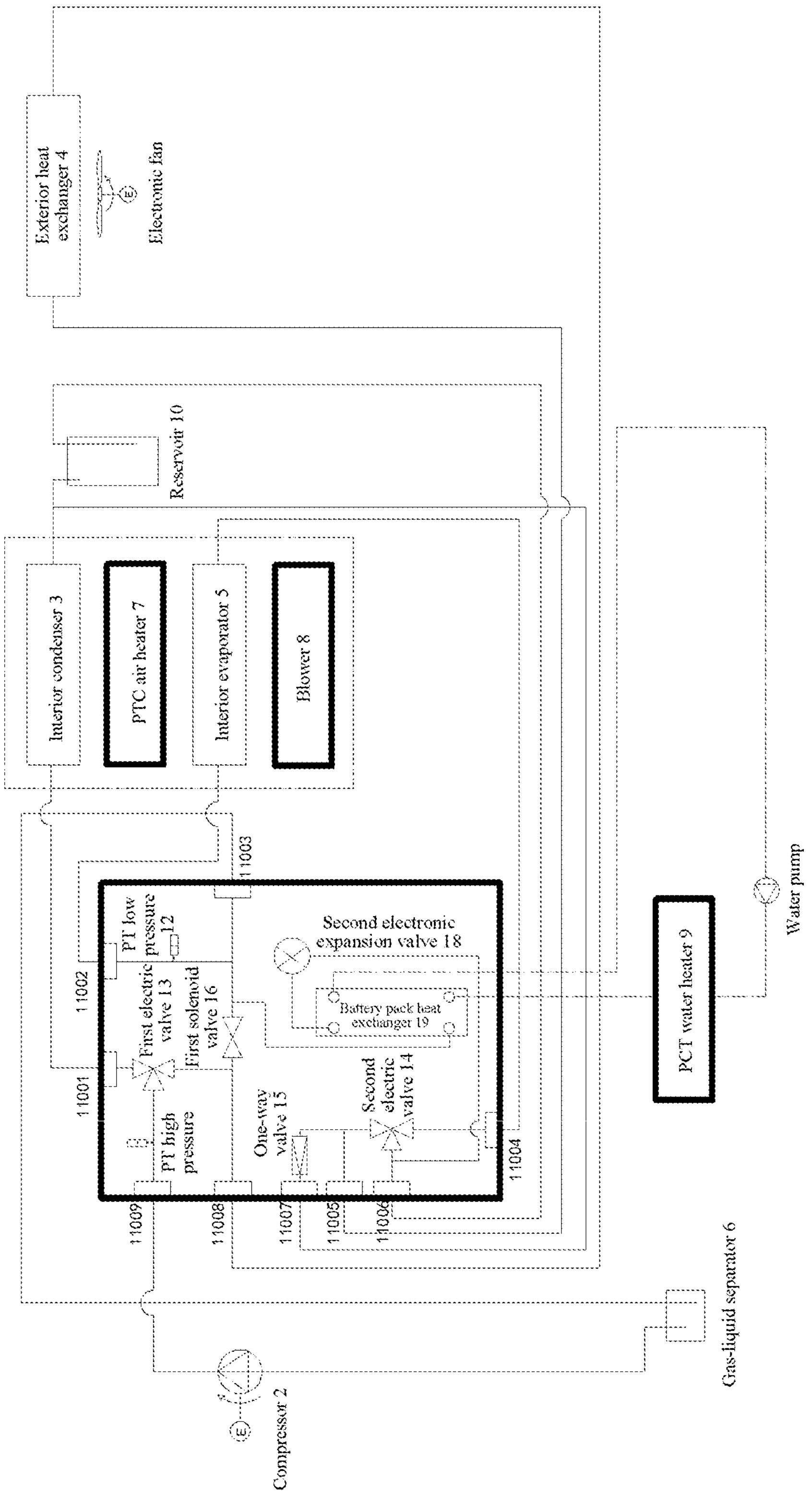
FIG. 1 is a schematic diagram of a thermal management system according to an exemplary embodiment of the present disclosure.

Specific implementations of the present disclosure are described in detail below with reference to the accompanying drawings. It should be understood that the specific implementations described herein are merely used to describe and explain the present disclosure, but are not intended to limit the present disclosure.

In the present disclosure, without the contrary explanation, the directional terms "inside and outside" refer to inside and outside of a relevant part, unless otherwise stated. In addition, terms "first", "second" and "third" are only used for distinguishing the description and cannot be understood as indicating or implying relative importance. In addition, in the description of the present disclosure, it should be noted that, unless otherwise specified or defined, the terms "arrangement", "communication", "installation" should be broadly understood, for example, may be fixed connection, may also be detachable connection or integrated connection; or may be a direct connection, an indirect connection through a middle medium, or interior communication between two elements. A person of ordinary skill in the art may understand the specific meanings of the foregoing terms in the present disclosure according to specific situations.

The present disclosure provides a valve set integrated module. The valve set integrated module may be configured to implement at least one of multiple preset thermal management modes. The preset thermal management modes here include but are not limited to an air conditioning refrigeration mode, a heat pump heating mode, a battery cooling mode, a mode enabling both air conditioning refrigeration and battery cooling, and a dehumidification mode. Specific working principles of the thermal management modes are described in detail later.

To realize the multiple preset thermal management modes listed above, the thermal management system includes an external heat exchange assembly and a valve set integrated module provided in the present disclosure. The heat exchange component includes multiple of a compressor 2, an interior condenser 3, an exterior heat exchanger 4, an interior evaporator 5, a gas-liquid separator 6, a PTC air heater 7, a blower 8, and a PTC water heater 9.

As shown in FIG. 1 to FIG. 23, the valve set integrated module provided by the present disclosure includes a body 11, a first electric valve 13, and a second electric valve 14. The body 11 is provided with multiple internal flow channels and multiple interfaces configured to communicate the internal flow channels with an external heat exchange assembly of the thermal management system. The first electric valve 13 and the second electric valve 14 are arranged on the body 11 and configured to communicate parts of the multiple internal flow channels to form multiple different thermal management circuits. The first electric valve 13 and the second electric valve 14 are configured to unblock/block and/or throttle the thermal management circuits to achieve at least one of the multiple preset thermal management modes.

It should be noted that the first electric valve 13 and the second electric valve 14 are configured to unblock/block and/or throttle the thermal management circuits means that the first electric valve 13 and the second electric valve 14 are each an independent valve. To achieve different preset thermal management modes, the first electric valve 13 is used as an example, and the first electric valve 13 may be configured to switch between an unblocking/blocking function and a throttling-induced pressure reducing function. It can also be said that the first electric valve can be used as both a solenoid valve and an expansion valve, or the first electric valve 13 may be configured as the expansion valve to throttle different thermal management circuits, or the first electric valve 13 may be configured as a solenoid valve to unblock/block different thermal management circuits. The second electric valve 14 may be configured in the same configuration as the first electric valve 13 to achieve the same function. Details are not described herein again.

The first electric valve 13 and the second electric valve 14 may be any electric valve capable of switching between an unblocking/blocking function and a throttling-induced pressure reducing function. The first electric valve 13 is used as an example. As described in FIG. 4, the first electric valve 13 may include a spherical valve core 1305, an adjustment base 1307, and an execution motor 1301. The valve body 1305 is provided with a first channel and a second channel for communicating with each other and for communicating with the internal flow channel. The adjustment base 1307 is configured to hold the valve core 1305 in the body 11. For example, the adjustment base 1307 is provided with an external thread, and the body 11 is provided with an internal thread for mating with the external thread. The execution motor 1301 is configured to drive the valve core 1305 to rotate, and with the rotation of the valve core 1305, the first electric valve 13 can realize the function of switching between an unblocking/blocking function and a throttling-induced pressure reducing function. Further, annular sealing blocks 1304 are arranged on two ends of the first electric valve 13 in a mounting direction to define an interface. The execution motor 1301 is mounted to the body 11 through a screw 1302. The second electric valve 13 may have the same configuration as the first electric valve 14. Details are not described herein again.

In the above technical solution, multiple internal flow channels are arranged inside the valve set integrated module body 11 to replace the existing connecting pipeline, which is beneficial to simplify the design of the connecting pipeline in the thermal management system. From the perspective of lightweight, a design the body is provided with multiple internal flow channels and multiple valves integrated in the module is conducive to reducing an overall weight of the module and is conducive to a lightweight design of the vehicle. In addition, different interfaces arranged on the body 11 communicate the internal flow channel with the heat exchange assembly of the external thermal management system to form multiple different thermal management circuits, and the first electric valve 13 and the second electric valve 14 integrated on the module control the unblocking/blocking or the throttling of the thermal management circuits, to realize multiple preset thermal management modes.

According to an implementation of the present disclosure, the internal flow channel includes an internal flow channel and an external flow channel. The body 11 includes a first portion 1101 and a second portion 1102. The first portion 1101 has a first connecting surface, and the second portion 1102 has a second connecting surface. The first connecting surface is hermetically connected with the second connecting surface. Multiple internal flow channels are arranged inside the first portion 1101. At least one groove is arranged on the second connecting surface of the second portion 1102, and the groove on the second connecting surface and the first connecting surface jointly define the external flow channel. The multiple internal flow channels are arranged inside the first portion 1101, an external flow channel is defined between the first portion 1101 and the second portion 1102, and the external flow channel and the internal flow channel are selectively communicated through a valve, thereby optimizing an arrangement of the internal flow channel of the body 1, for example, reducing a quantity of internal flow channels and avoiding mutual interference between the internal flow channels. The present disclosure provides an exemplary description of the internal flow channel arrangement in the description that follows.

Figure 2:
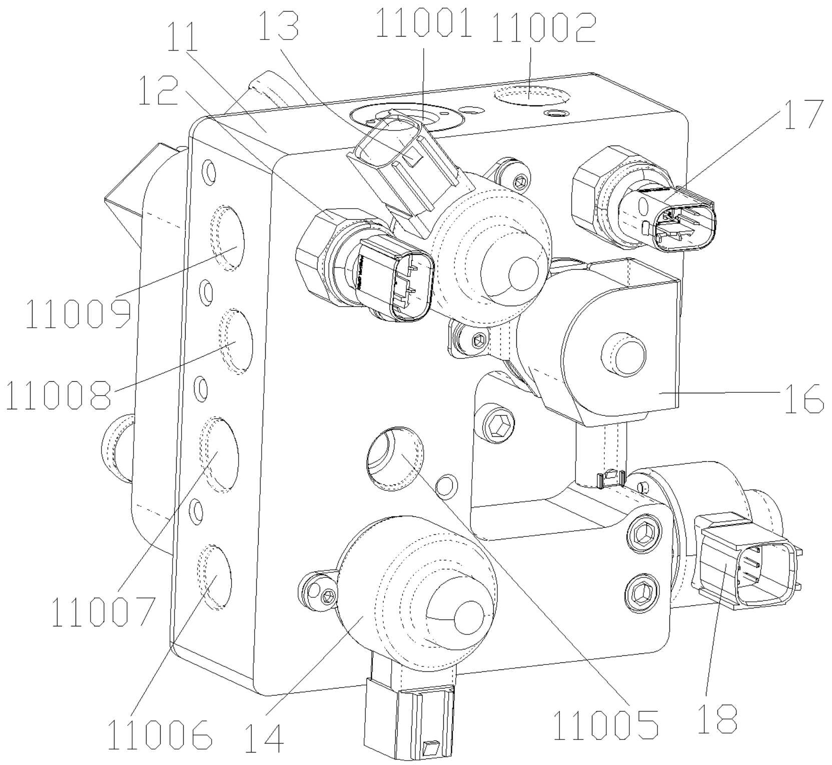
FIG. 2 is an assembly diagram of a valve set integrated module according to an exemplary embodiment of the present disclosure.
Figure 3:
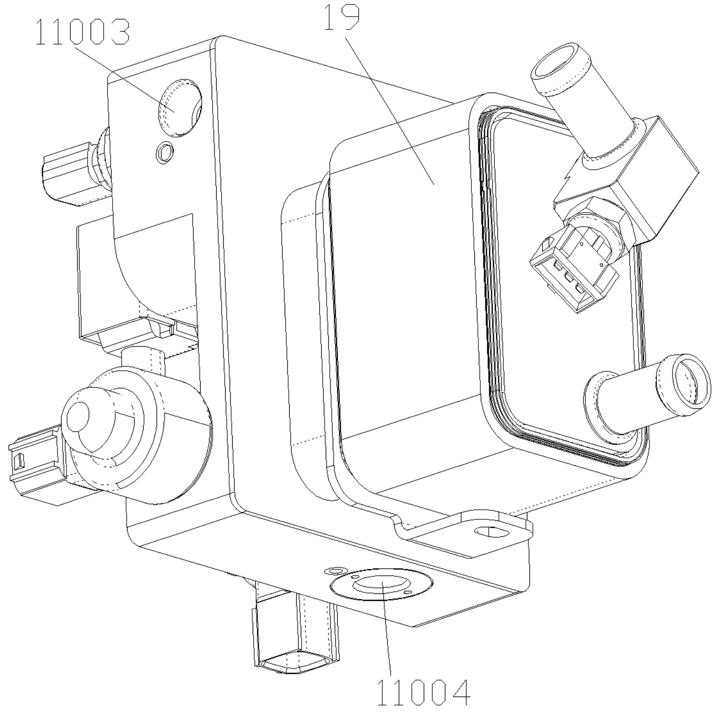
FIG. 3 is an assembly diagram of the valve set integrated module in FIG. 2 from another perspective.
Figure 4:
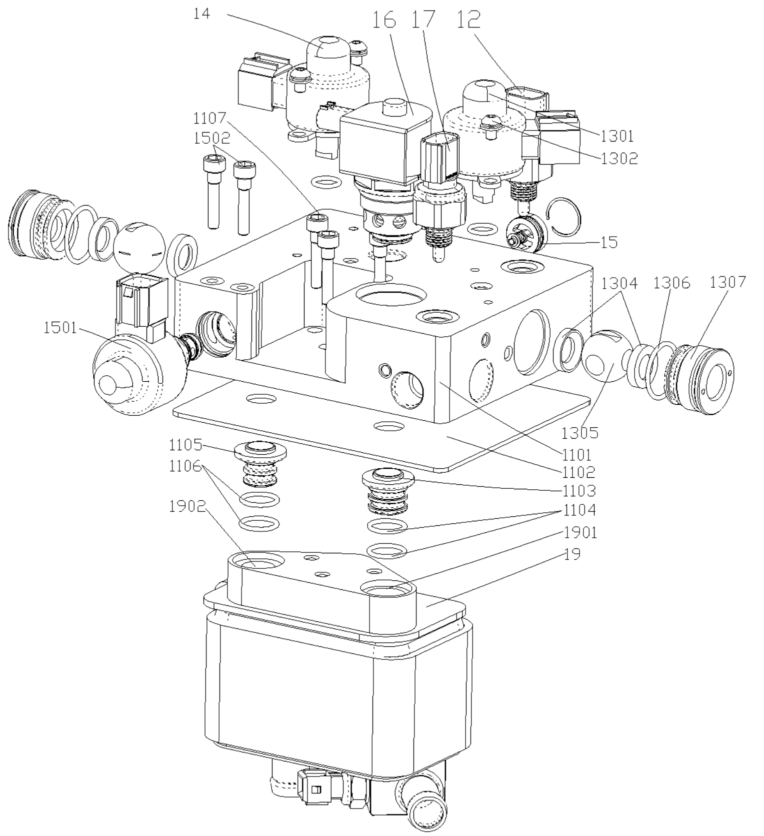
FIG. 4 is an exploded view of a valve set integrated module according to an exemplary embodiment of the present disclosure.
Figure 5:
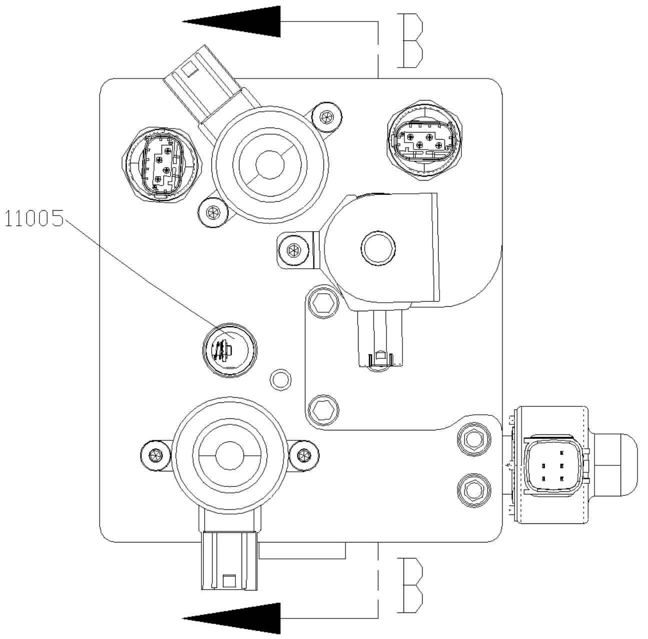
FIG. 5 is a front view of a valve set integrated module according to an exemplary embodiment of the present disclosure.
Figure 6:
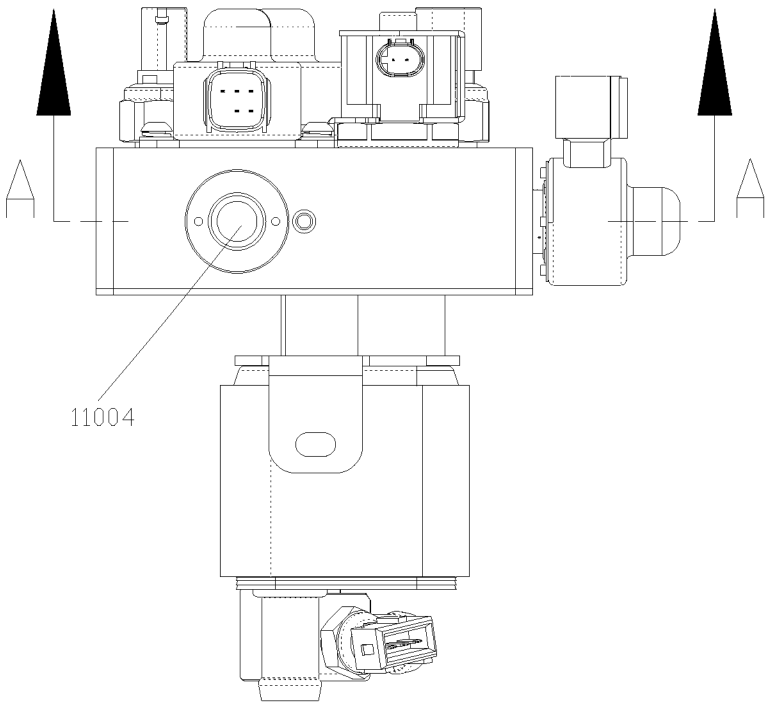
FIG. 6 is a bottom view of a valve set integrated module according to an exemplary embodiment of the present disclosure.
Figure 7:
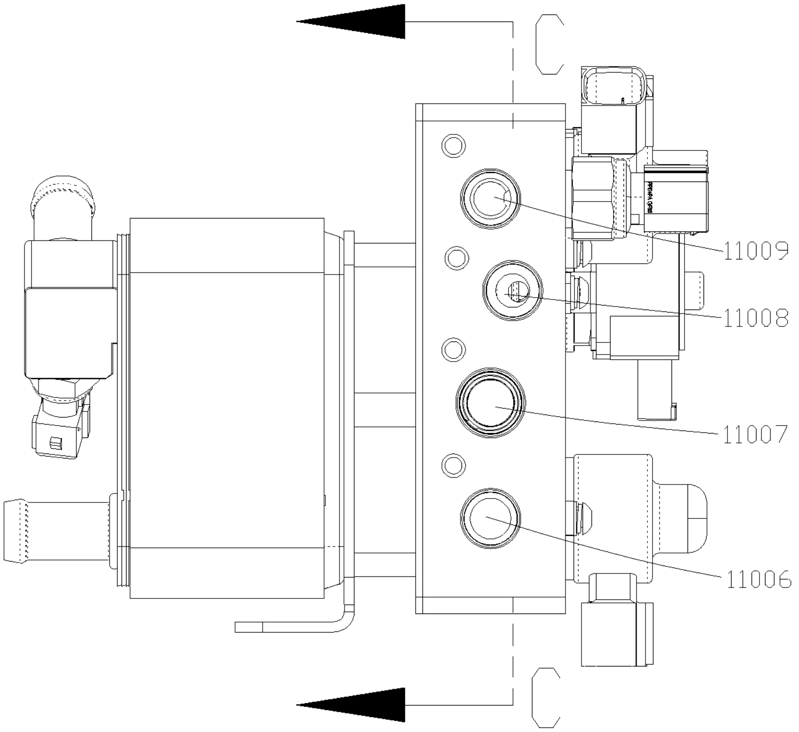
FIG. 7 is a left side view of a valve set integrated module according to an exemplary embodiment of the present disclosure.
Figure 8:
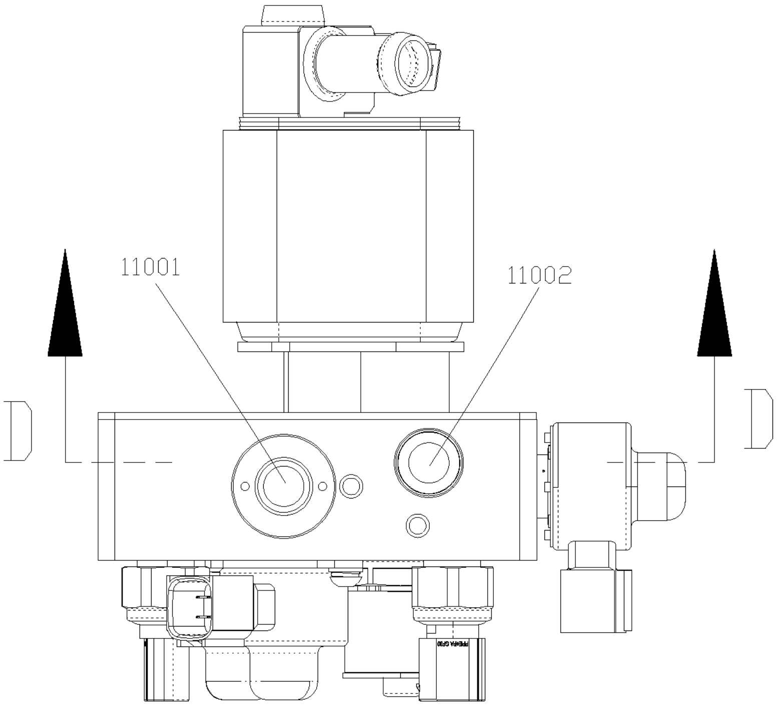
FIG. 8 is a top view of a valve set integrated module according to an exemplary embodiment of the present disclosure.
Figure 9:
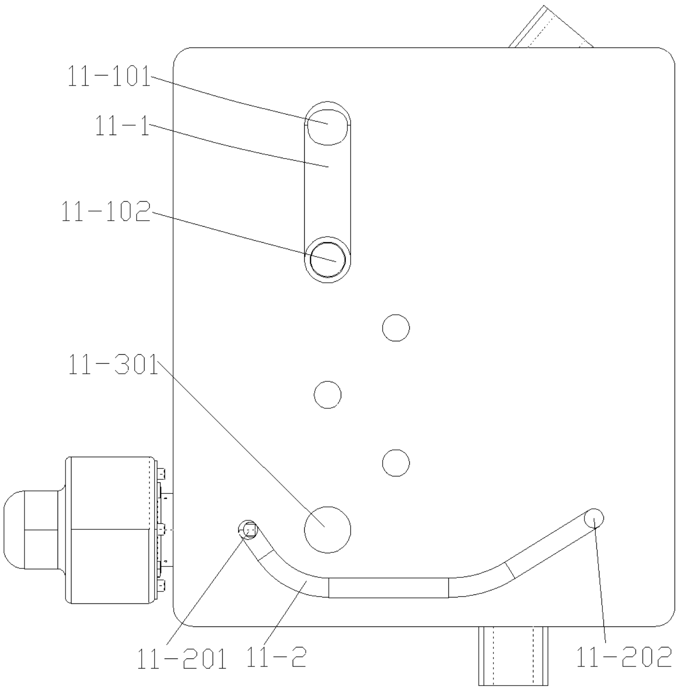
FIG. 9 is a schematic diagram of arrangement of an internal flow channel of a valve set integrated module according to an exemplary embodiment of the present disclosure.
Figure 10:
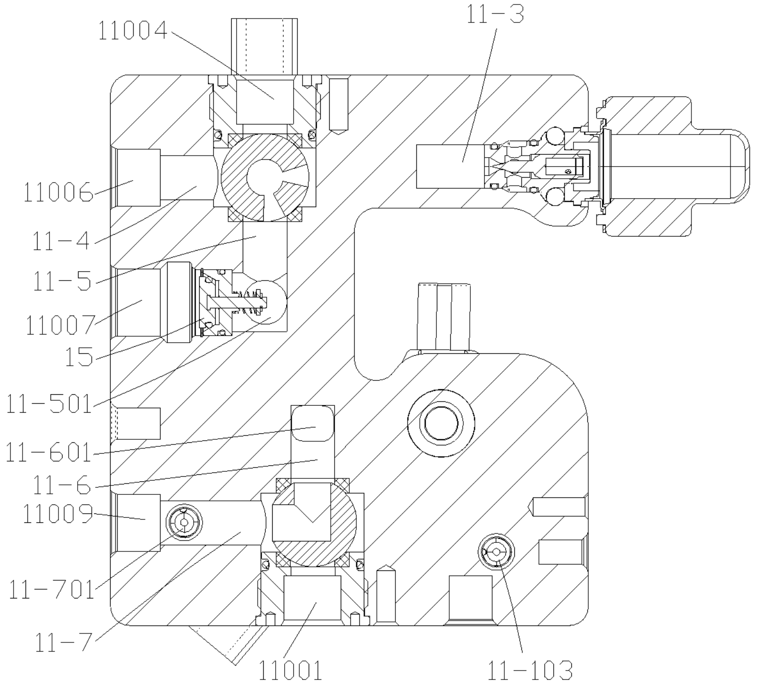
FIG. 10 is a cross-sectional view of the valve set integrated module in FIG. 6 taken along line A-A.
Figure 11:
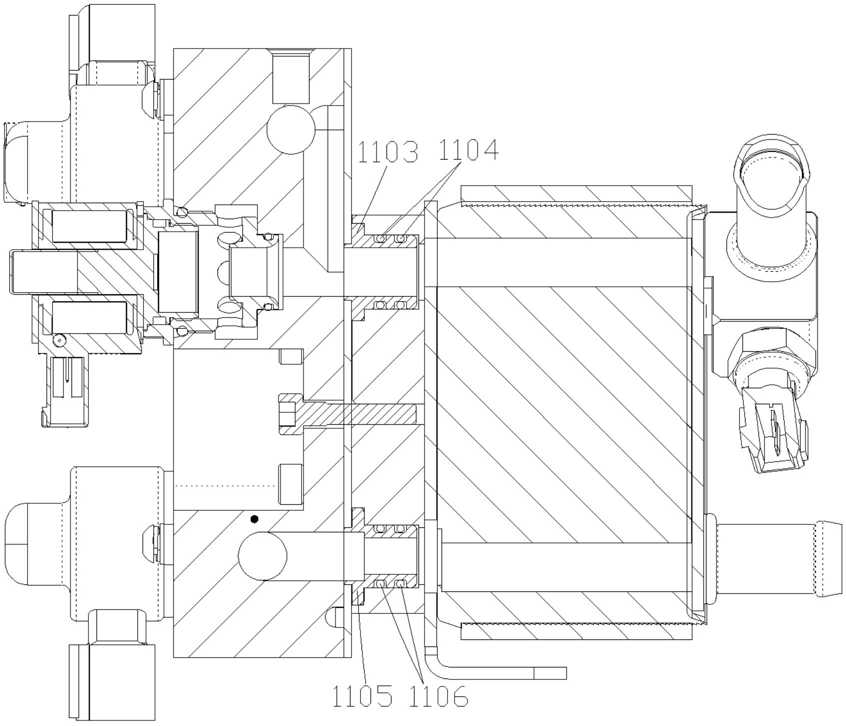
FIG. 11 is a cross-sectional view of the valve set integrated module in FIG. 5 taken along line B-B.
Figure 12:
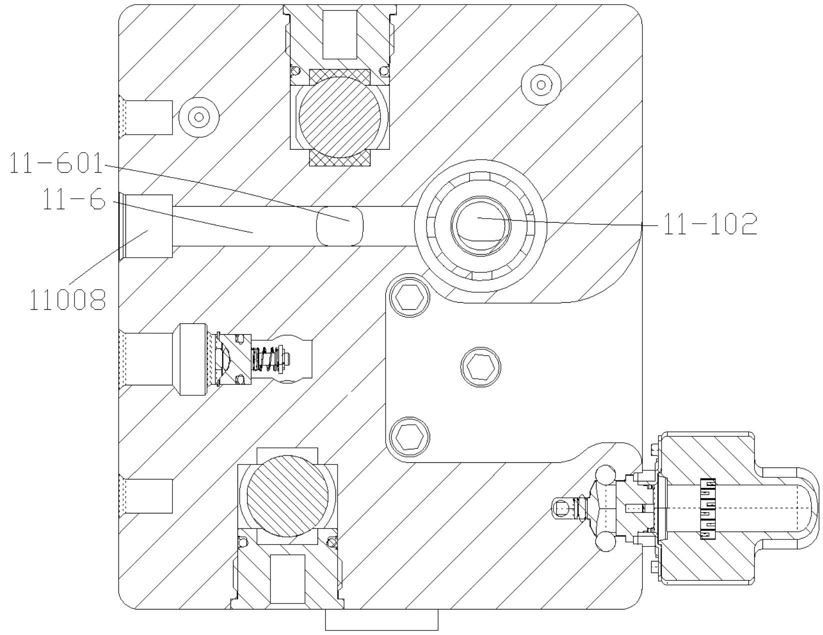
FIG. 12 is a cross-sectional view of the valve set integrated module in FIG. 7 taken along line C-C.
Figure 13:
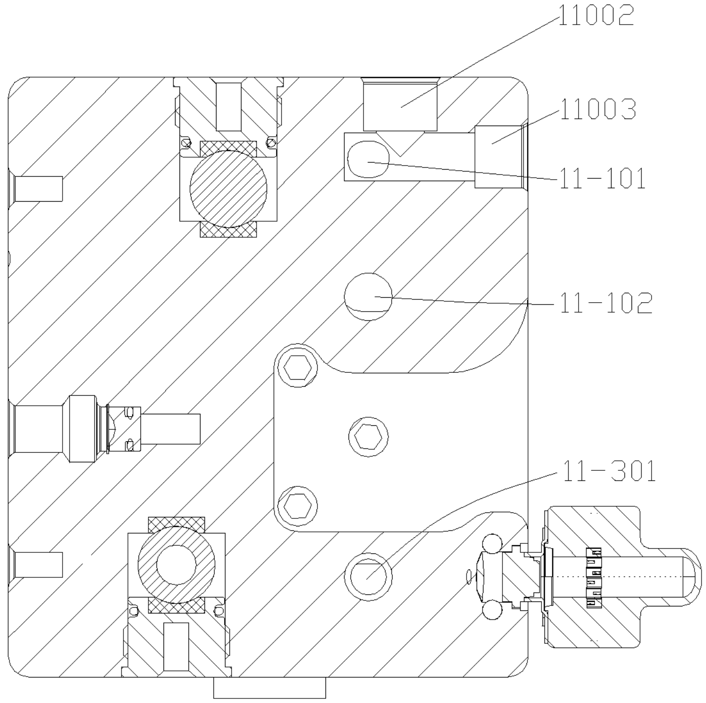
FIG. 13 is a cross-sectional view of the valve set integrated module in FIG. 8 taken along line D-D.

In an implementation of the present disclosure, as shown in FIG. 1 to FIG. 3, the first electric valve 13 is configured to unblock/block different thermal management circuits, that is, the first electric valve 13 is configured as a solenoid valve to unblock/block the different thermal management circuits. A first end of the first electric valve 13 is in communication with a compressor interface 11009, and a second end of the first electric valve 13 is selectively communicated with or blocked from an interior heat exchanger inlet interface 11005 or an interior condenser inlet interface 11001. The selective unblocking/blocking means that the first electric valve 13 is controlled as required to communicate with the interior heat exchanger inlet interface 11005 in some thermal management modes, and with the interior condenser inlet interface 11001 in some other thermal management modes. The second electric valve 14 is configured to throttle the different thermal management circuits, that is, the second electric valve 14 is configured as the expansion valve to throttle the different thermal management circuits. A first end of the second electric valve 14 is in communication with a liquid reservoir outlet interface 11006. A second end of the second electric valve 14 is selectively communicated with or blocked from an interior evaporator inlet interface 11004 or an exterior heat exchanger inlet interface 11005. The throttling means the second electric valve 14 is controlled as required to throttle with the interior evaporator inlet interface 11004 in some thermal management modes, and with the exterior heat exchanger inlet interface 11005 in some other thermal management modes.

Further, the valve set integrated module further includes a one-way valve 15 arranged on the body 11. An inlet of the one-way valve 15 is in communication with the exterior heat exchanger inlet interface 11005, and an outlet of the one-way valve 15 is in communication with the second electric valve 14. Through this design, an object of exchanging an inlet and an outlet of the exterior heat exchanger can be realized. For example, in the air-conditioning refrigeration mode, refrigerant flow from the first interface to the second interface. In this case, the design of the flow channel inside the exterior heat exchanger is adapted to the air-conditioning refrigeration. A state of the refrigerant is different during the cooling and heating process. In the heating mode, the refrigerant still flows from a first interface of the exterior heat exchanger to a second interface, and the design of the flow channel inside the exterior heat exchanger is not ideal for the refrigerant adaptability in the heating mode. Therefore, the above problems can be solved by exchanging the inlet and the outlet of the exterior heat exchanger.

In addition, the valve set integrated module may further include a first solenoid valve 16 arranged on the body 11. A first end of the first solenoid valve 16 is in communication with an exterior heat exchanger outlet interface 11008, and a second end of the first solenoid valve 16 is in communication with a gas-liquid separator inlet interface 11003. That is to say, different preset thermal management modes can be further realized by controlling the unblocking/blocking of the first solenoid valve 16.

According to an implementation of the present disclosure, to further realize the thermal management mode of battery pack cooling, as shown in FIG. 1 to FIG. 3, the valve set integrated module may further include a second electronic expansion valve 18 arranged on the body 11. A first end of the second electronic expansion valve 18 is in communication with an exterior heat exchanger outlet interface 11008, and a second end of the second electronic expansion valve 18 is in communication with a battery pack heat exchanger inlet interface arranged on the body 11. The second electronic expansion valve 18 may include an insertion portion 1801 for inserting into the body 11. The second electronic expansion valve 18 and the body 11 are fixedly connected by a threaded pin 1802 through a trailing end of the body 11.

The valve set integrated module may further include a battery pack heat exchanger 19 arranged on the body 11. The battery pack heat exchanger 19 can be connected to the body 11 through a screw 1107. An inlet of the battery pack heat exchanger 19 is in communication with the battery pack heat exchanger inlet interface, and an outlet of the battery pack heat exchanger 19 is connected to a gas-liquid separator 6. In a manner for mounting the battery pack heat exchanger 19, connecting joints 1103 and 1105 configured to connect with the first end and the second end of the battery pack heat exchanger 19 and O-rings 1104 and 1106 configured to seal the first end and the second end of the battery pack heat exchanger 19 are respectively arranged on the body 11. The battery pack heat exchanger 19 is connected to the body 11 through a threaded fastener.

The thermal management modes that can be realized by the above technical solution are exemplarily described below in conjunction with FIG. 1 to FIG. 13.

In order to facilitate the description of the thermal management mode, the arrangement of the internal flow channels is first exemplarily described here. An outlet 11-102 of the first solenoid valve 16, an outlet 1901 of the battery pack heat exchanger 19, an interface 11-101, an interior evaporator inlet interface 11002, and the gas-liquid separator inlet interface 11003 communicate to form a first internal flow channel 11-1. An inlet 11-201 of the second electronic expansion valve 16, the liquid reservoir outlet interface 11006, and an interface 11-202 are communicated to form a second internal flow channel 11-2. An outlet of the second electronic expansion valve 16 and an inlet 1902 of the battery pack heat exchanger are communicated to form a third internal flow channel 11-3. An inlet of the second electric valve 14 and the condenser outlet interface 11006 are communicated to form a fourth internal flow channel 11-4. An outlet of the second electric valve 14 and the exterior heat exchanger inlet interface 11005 are communicated to form a fifth internal flow channel 11-5. An outlet of the first electric valve 13, an inlet 11-601 of the second solenoid valve 16 and the exterior heat exchanger outlet interface 11008 are communicated to form a sixth internal flow channel 11-6. A PT high pressure interface and the compressor outlet re communicated to form a seventh internal flow channel 11-7. The multiple internal flow channels formed above may be partially used as the internal flow channel and partially used as the external flow channel as required. For example, a part between the outlet 11-102 of the first solenoid valve 16 and the interface 11-101 in the first internal flow channel 11-1 and the second internal flow channel may be configured as the external flow channels. In addition, an extending direction of the external flow channel can be specifically set according to the needs of avoiding interference, and the like, which is not limited here, and the other internal flow channels are the internal flow channels.

Air-Conditioning Refrigeration Mode:

The compressor 2 discharges a high-temperature and high-pressure gaseous refrigerant, which passes through the connecting pipeline and enters the first electric valve 13 through the compressor outlet interface 11009. In this case, the first electric valve 13 maintains the seventh internal flow channel 11-7 and the sixth internal flow channel 11-6 in communication, and flows out of the valve set integrated module through the exterior heat exchanger outlet interface 11008. The refrigerant flowing out of the module enters the exterior heat exchanger 4 through the connecting pipeline for heat exchange, and the refrigerant flowing out of the exterior heat exchanger 4 passes through the exterior heat exchanger inlet interface 11005 and enters the one-way valve 15 through the connecting pipeline. The refrigerant flowing through the one-way valve 15 passes through the reservoir inlet interface 11007 and communicates with the reservoir through the connecting pipeline, so that the refrigerant enters the reservoir 10. The refrigerant flowing out of the reservoir 10 passes through the liquid reservoir outlet interface 11006 and enters the second electric valve 14 through the connecting line. The second electric valve 14 maintains the fourth internal flow channel 11-4 in communication with the interior evaporator inlet interface 11004 and realizes throttling-induced pressure reduction, so that the refrigerant enters the interior evaporator 5 to absorb ambient heat for evaporation. The cooled ambient temperature blows cold air into the member compartment through the blower 8 to achieve cooling. The refrigerant flowing out of the interior evaporator 5 passes through the interior evaporator outlet interface 11002 and enters the valve set integrated module through the connecting pipeline, passes through the PT low pressure sensor 12 and then enters the gas-liquid separator 6 through the gas-liquid separator inlet 11003, and finally returns to the compressor 2, thereby completing an air conditioning refrigeration mode cycle.

Heat Pump Heating Mode:

The compressor 2 discharges a high-temperature and high-pressure gaseous refrigerant, which passes through the connecting pipeline and enters the first electric valve 13 through the compressor outlet interface 11009. In this case, the first electric valve 13 maintains the seventh internal flow channel 11-7 in communication with the interior condenser inlet interface 11001. The refrigerant flowing out of the module enters the interior condenser through the connecting pipeline to release heat, the interior condenser 3 releases heat and combines with the PTC air heater 7, and then blows the hot air into the vehicle through the blower 8 to heat the vehicle. The refrigerant is exothermic and liquefied in the interior condenser 3, and then flows into the reservoir 10 through the connecting pipeline for storage. The refrigerant flowing out of the reservoir 10 passes through the liquid reservoir outlet interface 11006 on the module and enters the second electric valve 14 through the connecting line. The second electric valve maintains the fourth internal flow channel 11-4 in communication with the fifth internal flow channel 11-5, so that the refrigerant flows to the exterior heat exchanger inlet interface 11005 through the interface 11-501. The refrigerant flowing out of the module communicates with the exterior heat exchanger 4 through the connecting pipeline, and enters the exterior heat exchanger 4 for heat exchange. The refrigerant flowing out of the exterior heat exchanger 4 passes through the exterior heat exchanger outlet interface 11008 and enters the first solenoid valve 16 through the connecting pipe. In this case, the first solenoid valve 16 is in an open state. The refrigerant flowing out of the first solenoid valve outlet 11-102 passes through the first internal flow channel 11-1, and passes through the interface 11-103 of the PT low pressure sensor 12 through the gas-liquid separator inlet interface 11003, and is connected to the gas-liquid separator through the connecting line 6 and finally back to the compressor 2, thereby completing a heat pump heating mode cycle.

Dehumidification Mode:

The compressor 2 discharges a high-temperature and high-pressure gaseous refrigerant, which passes through the connecting pipeline and enters the first electric valve 13 through the compressor outlet interface 11009. In this case, the first electric valve 13 maintains the seventh internal flow channel 11-7 and the sixth internal flow channel 11-6 in communication, and flows out of the valve set integrated module through the exterior heat exchanger outlet interface 11008. The refrigerant flowing out of the module enters the exterior heat exchanger 4 through the connecting pipeline for heat exchange, and the refrigerant flowing out of the exterior heat exchanger 4 enters the one-way valve 15 through the connecting pipeline by the exterior heat exchanger inlet interface 11005. The refrigerant flowing through the one-way valve 15 passes through the reservoir inlet interface 11007 and communicates with the reservoir 10 through the connecting pipeline, so that the refrigerant enters the reservoir 10. The refrigerant flowing out of the reservoir 10 passes through the liquid reservoir outlet interface 11006 and enters the second electric valve 14 through the connecting line. The second electric valve 14 maintains the fourth internal flow channel 11-4 in communication with the interior evaporator inlet interface 11004 and realizes throttling-induced pressure reduction, so that the refrigerant enters the interior evaporator 5. The refrigerant absorbs heat in the interior evaporator 5 and then cools, circulates the indoor air with the interior evaporator 5 through the blower 8, and the indoor water vapor condenses when passing through the outside of the interior evaporator 5 to achieve the function of dehumidification.

Battery Cooling Mode:

The compressor 2 discharges a high-temperature and high-pressure gaseous refrigerant, which passes through the connecting pipeline and enters the first electric valve 13 through the compressor outlet interface 11009. In this case, the first electric valve 13 maintains the seventh internal flow channel 11-7 and the sixth internal flow channel 11-6 in communication, and flows out of the valve set integrated module through the exterior heat exchanger outlet interface 11008. The refrigerant flowing out of the module enters the exterior heat exchanger 4 through the connecting pipeline for heat exchange, and the refrigerant flowing out of the exterior heat exchanger 4 enters the one-way valve 15 through the connecting pipeline by the exterior heat exchanger inlet interface 11005. The refrigerant flowing through the one-way valve 15 communicates with the reservoir 10 through the connecting pipeline through the reservoir inlet interface 11007, so that the refrigerant enters the reservoir 10. The refrigerant flowing out of the reservoir 10 passes through the liquid reservoir outlet interface 11006 and flows into the module through the connecting line, and enters the battery pack heat exchanger 19 after being vaporized through the second electronic expansion valve 18. The low-temperature refrigerant exchanges heat with the water circuit to cool the battery pack.

Mode Enabling Both Air Conditioning Refrigeration and Battery Cooling:

The compressor 2 discharges a high-temperature and high-pressure gaseous refrigerant, which passes through the connecting pipeline and enters the first electric valve 13 through the compressor outlet interface 11009. In this case, the first electric valve 13 maintains the seventh internal flow channel 11-7 and the sixth internal flow channel 11-6 in communication, and flows out of the valve set integrated module through the exterior heat exchanger outlet interface 11008. The refrigerant flowing out of the module enters the exterior heat exchanger 4 through the connecting pipeline for heat exchange, and the refrigerant flowing out of the exterior heat exchanger 4 enters the one-way valve 15 through the connecting pipeline by the exterior heat exchanger inlet interface 11005. The refrigerant flowing through the one-way valve 15 passes through the reservoir inlet interface 11007 and communicates with the reservoir 10 through the connecting pipeline, so that the refrigerant enters the reservoir 10. The refrigerant flowing out of the reservoir 10 passes through the liquid reservoir outlet interface 11006 and enters the second electric valve 14 through the connecting line. The second electric valve 14 maintains the fourth internal flow channel 11-4 in communication with the interior evaporator inlet interface 11004 and realizes throttling-induced pressure reduction, so that the refrigerant enters the interior evaporator 5 to absorb the ambient heat for evaporation. The cooled ambient temperature blows cold air into the member compartment through the blower 8 to achieve cooling. The second electronic expansion valve 18 is opened, the vaporized refrigerant enters the battery pack heat exchanger 19, and the low-temperature refrigerant exchanges heat with the water circuit to cool the battery pack.

Figure 14:
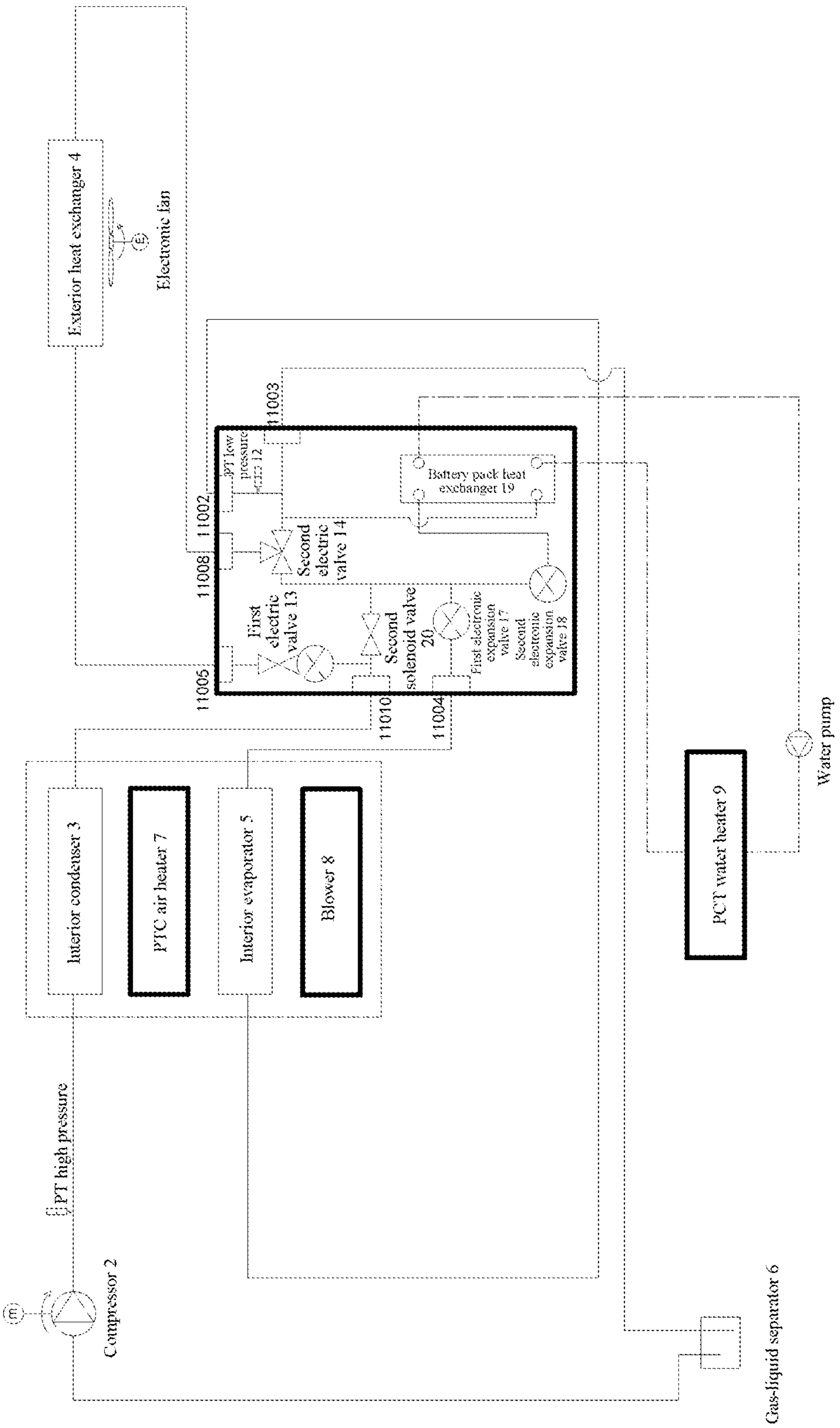
FIG. 14 is a schematic diagram of another thermal management system according to an exemplary embodiment of the present disclosure.
Figure 15:
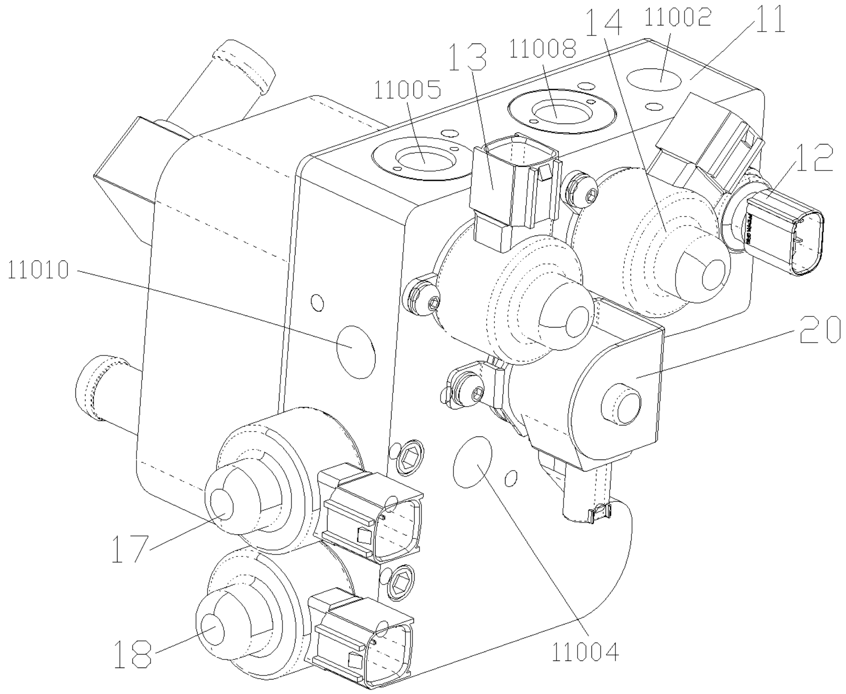
FIG. 15 is an assembly diagram of another valve set integrated module according to an exemplary embodiment of the present disclosure.
Figure 16:
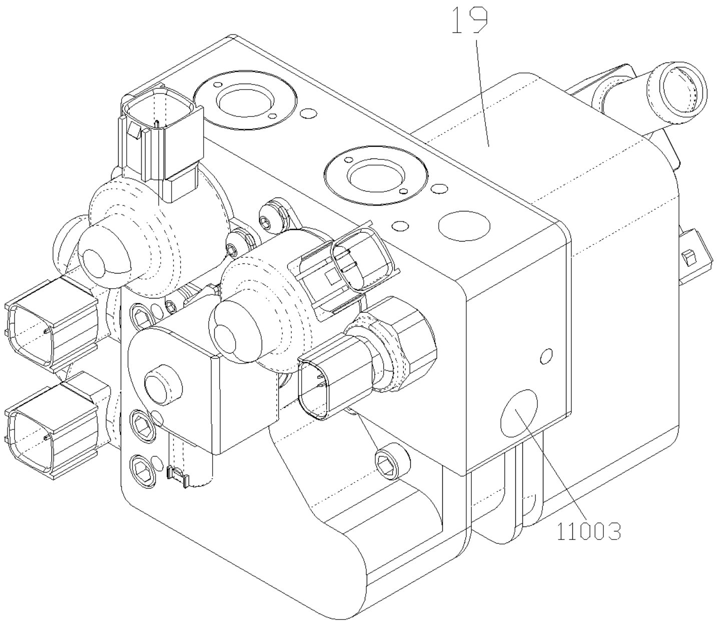
FIG. 16 is an assembly diagram of the valve set integrated module in FIG. 15 from another perspective.
Figure 17:
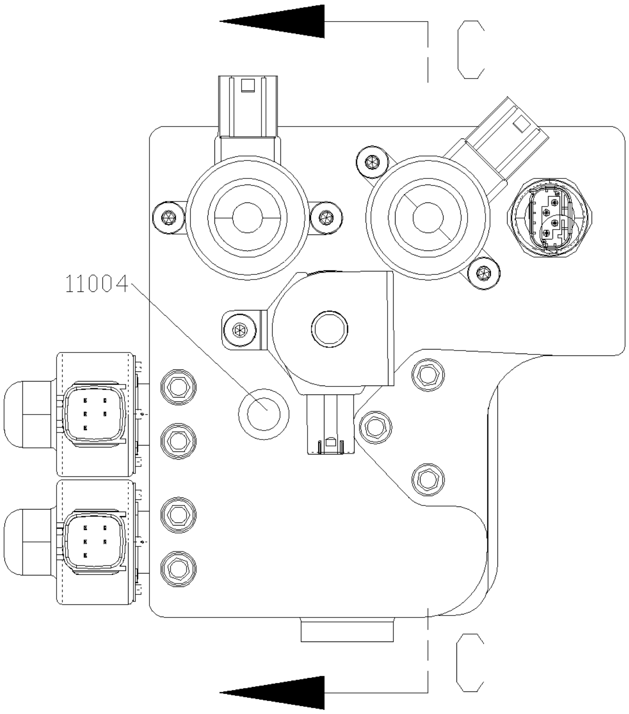
FIG. 17 is a front view of a valve set integrated module according to an exemplary embodiment of the present disclosure.
Figure 18:
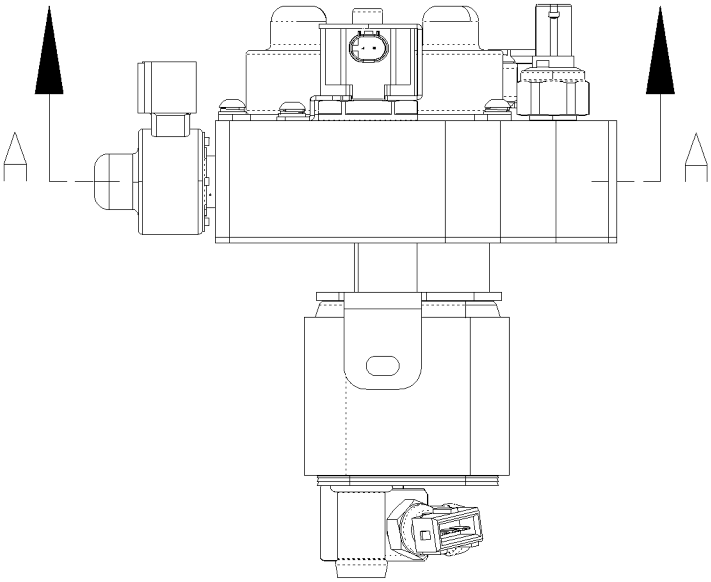
FIG. 18 is a bottom view of a valve set integrated module according to an exemplary embodiment of the present disclosure.
Figure 19:
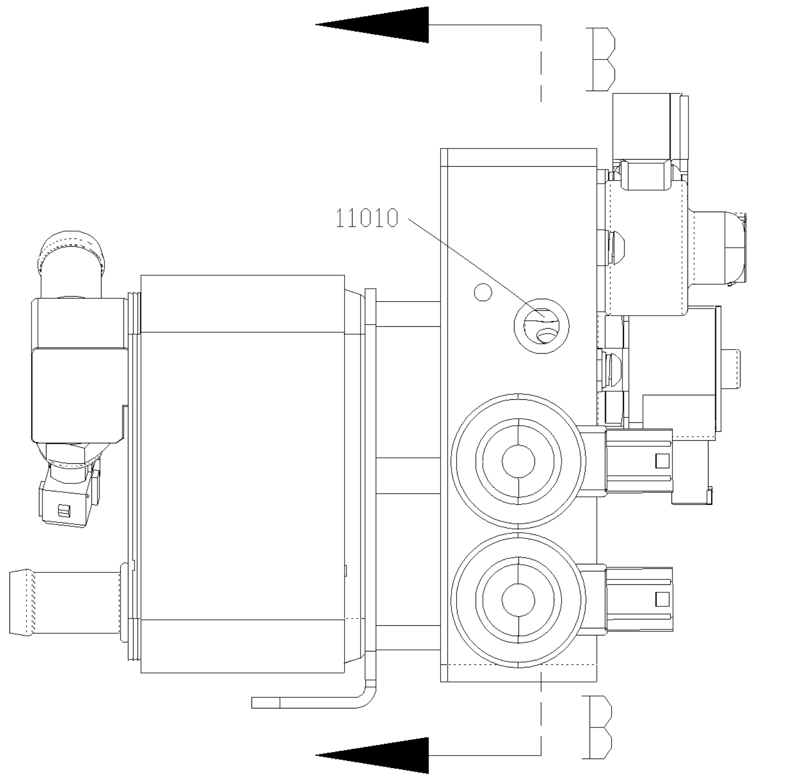
FIG. 19 is a right side view of a valve set integrated module according to an exemplary embodiment of the present disclosure.
Figure 20:
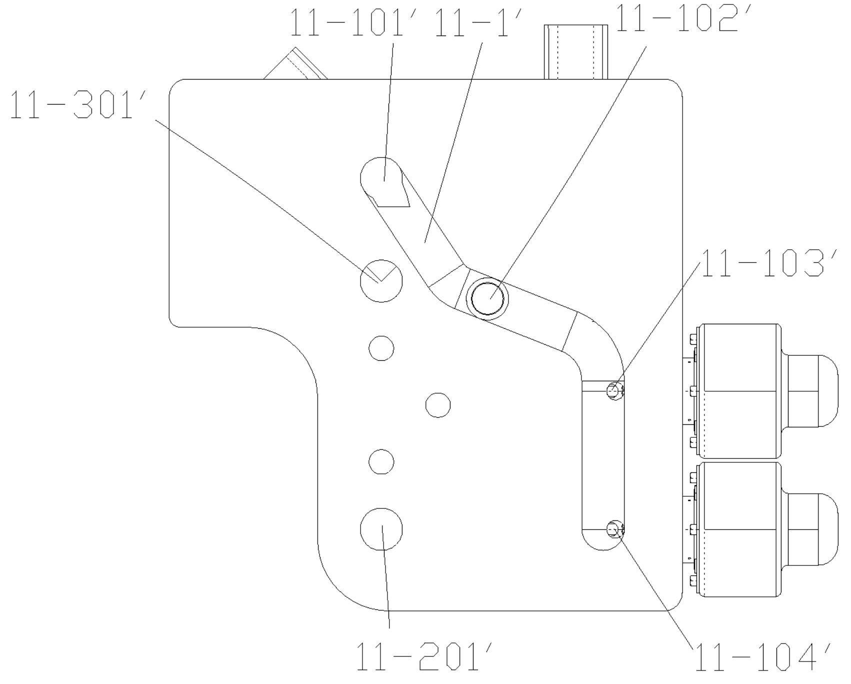
FIG. 20 is a schematic diagram of arrangement of an internal flow channel of a valve set integrated module according to an exemplary embodiment of the present disclosure.
Figure 21:
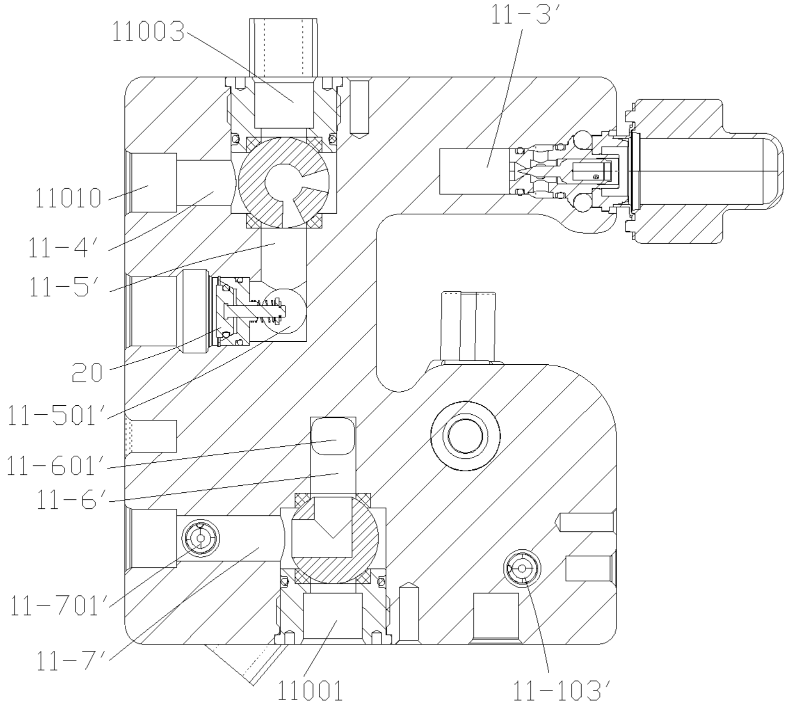
FIG. 21 is a cross-sectional view of the valve set integrated module in FIG. 18 taken along line A-A.
Figure 22:
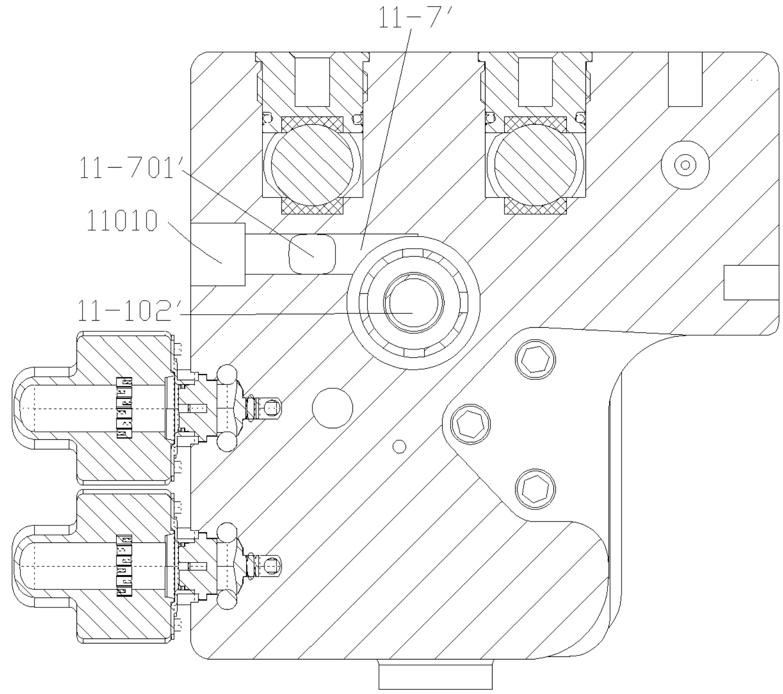
FIG. 22 is a cross-sectional view of the valve set integrated module in FIG. 19 taken along line B-B.
Figure 23:
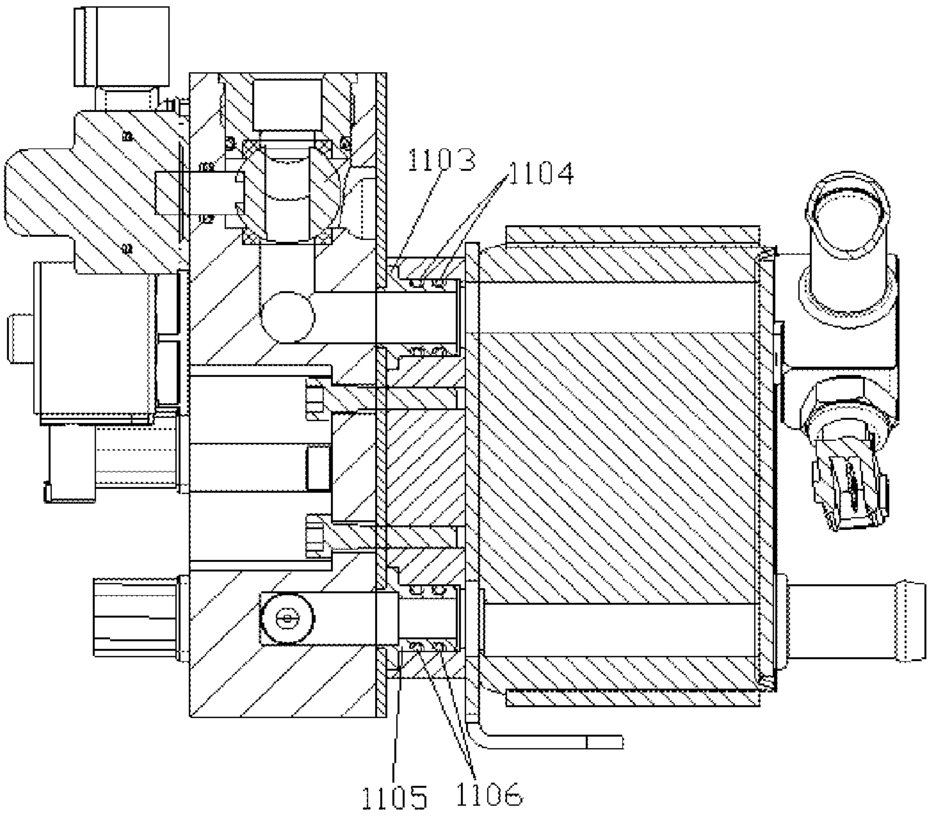
FIG. 23 is a cross-sectional view of the valve set integrated module in FIG. 17 taken along line C-C.

In another implementation of the present disclosure, as shown in FIG. 14 to FIG. 16, the first electric valve 13 is configured to unblock/block and throttle different thermal management circuits. That is to say, the first electric valve 13 is configured to be switchable between an unblocking/blocking position and a throttling position, or the first electric valve 13 can be configured as a solenoid valve and as an expansion valve. A first end of the first electric valve 13 is in communication with an interior condenser outlet interface 11010. A second end of the first electric valve 13 is in communication with the exterior heat exchanger inlet interface 11005. The second electric valve 14 is configured to unblock/block the different thermal management circuits, that is, the second electric valve 14 is configured as the solenoid valve to unblock/block the different thermal management circuits. A first end of the second electric valve 14 is in communication with the exterior heat exchanger outlet interface 11008. A second end of the second electric valve 14 is selectively communicated with the interior evaporator inlet interface 11004 or the gas-liquid separator inlet interface 11003.

Further, the valve set integrated module further includes a first electronic expansion valve 17 arranged on the body 11. A first end of the first electronic expansion valve 17 is in communication with the second electric valve 14, and a second end of the first electronic expansion valve 17 is in communication with the interior evaporator inlet interface 11004. Optionally, the valve set integrated module further includes a second solenoid valve 20 arranged on the body 11. A first end of the second solenoid valve 20 is in communication between the interior condenser outlet interface 10010 and the first electric valve 13 through a pipeline. A second end of the second solenoid valve 20 is in communication between the second electric valve 14 and the first electronic expansion valve 17 through the pipeline.

According to an implementation of the present disclosure, to further realize the thermal management mode of battery pack cooling, as shown in FIG. 1 to FIG. 3, the valve set integrated module may further include a second electronic expansion valve 18 arranged on the body 11. A first end of the second electronic expansion valve 18 is in communication with an exterior heat exchanger outlet interface 11008, and a second end of the second electronic expansion valve 18 is in communication with a battery pack heat exchanger inlet interface arranged on the body 11. The valve set integrated module may further include a battery pack heat exchanger 19 arranged on the body 11. An inlet of the battery pack heat exchanger 19 is in communication with the battery pack heat exchanger inlet interface, and an outlet of the battery pack heat exchanger 19 is connected to a gas-liquid separator 6.

The thermal management modes that can be realized by the above technical solution are exemplarily described below in conjunction with FIG. 14 to FIG. 23.

In order to facilitate the description of the thermal management mode, the arrangement of the internal flow channels is first exemplarily described here. An outlet 11-101' of the second electric valve 14, an outlet 11-102' of the second solenoid valve 20, an outlet 11-103' of the first electronic expansion valve 17, and the second electronic expansion valve 18 inlet are communicated to form first internal flow channel 11-1'. An outlet of the second electronic expansion valve 18 and an inlet 1902 of the battery pack heat exchanger are communicated through the interface 11-201' to form a second internal flow channel 11-2'. An outlet of the second electric valve 14, that is, an outlet 1901 of the battery pack heat exchanger connected through 11-301', is communicated with the inlet connection interface 11003 of the gas-liquid separator, a fourth inner flow channel 11-4' and a PT low pressure sensor interface 11-401 'and the interior evaporator outlet interface 11002 to form a third inner flow channel 11-3'. An inlet 11-701' of the first electric valve 13 communicates with an inlet of the second solenoid valve 20, that is, the interior condenser outlet interface 11010, to form a fifth inner flow channel 11-5'. The multiple internal flow channels formed above may be partially used as the internal flow channel and partially used as the external flow channel as required. For example, the first internal flow channel 11-1' may be configured as the external flow channel. In addition, an extending direction of the external flow channel can be specifically set according to the needs of avoiding interference, and the like, which is not limited here, and the other internal flow channels are the internal flow channels.

Air-Conditioning Refrigeration Mode:

The compressor 2 discharges a high-temperature and high-pressure gaseous refrigerant and enters the interior condenser 3. After the refrigerant is exothermic and liquefied in the interior condenser 3, the refrigerant passes through the interior condenser outlet interface 11010 and enters the first electric valve 13. In this case, the first electric valve 13 is switched to a solenoid valve and is in an open state, and an interface 11-701' of a first inner flow channel 11-7' is maintained in communication with an outlet of the first electric valve 13, that is, the exterior heat exchanger inlet 11005. The refrigerant enters the exterior heat exchanger 4 through the connecting line, and the refrigerant flowing out of the exterior heat exchanger 4 passes through the exterior heat exchanger outlet interface 11008 and enters the second electric valve 14 through the connecting line. In this case, the second electric valve 14 maintains the interior evaporator inlet interface 11008 in communication with an outlet 11-101' of the second electric valve 14, and is communicated with an inlet 11-103' of the first electronic expansion valve 17 through the first inner flow channel 11-1'. After the throttling-induced pressure reduction by the first electronic expansion valve 17, the refrigerant passes through the interior evaporator inlet interface 11004 and enters the interior evaporator 5 through the connecting pipeline to absorb the ambient heat for evaporation. The cooled ambient temperature blows cold air into the crew compartment through the blower 8 to cool. The refrigerant flowing out of the interior evaporator 5 passes through the interior evaporator outlet interface 11002 and enters the valve set integrated module through the connecting pipeline, passes through the PT low pressure sensor 12 interface and enters the third inner flow channel 11-3' through the fourth inner flow channel 11-4', and passes through the gas-liquid separator inlet 11003 and enters the gas-liquid separator 6, and finally returns to the compressor 2, thereby completing an air conditioning refrigeration mode cycle.

Heat Pump Heating Mode:

The compressor 2 discharges a high-temperature and high-pressure gaseous refrigerant, and enters the interior condenser 3 to release heat. The interior condenser 3 releases heat and combines with the PTC air heater 7, and then blows the hot air into the vehicle through the blower 8 to heat the vehicle. After the refrigerant is exothermic and liquefied in the interior condenser 3, the refrigerant passes through the interior condenser outlet interface 11010 and enters the first electric valve 13. In this case, the first electric valve 13 is switched to an expansion valve for use, and an interface 11-701' of a first inner flow channel 11-7' is maintained in communication with an outlet of the first electric valve 13, that is, the exterior heat exchanger inlet interface 11005. The refrigerant after throttling-induced pressure reduction enters the exterior heat exchanger 4 through the connecting pipeline. The refrigerant flowing out of the exterior heat exchanger 4 passes through the exterior heat exchanger outlet interface 11008 and enters the second electric valve 14 through the connecting line. In this case, the second electric valve 14 maintains the exterior heat exchanger outlet interface 11008 in communication with the third inner flow channel 11-3', is connected to the gas-liquid separator 6 through the gas-liquid separator inlet 11003, and finally returns to the compressor 2, thereby completing a heat pump heating mode cycle.

Dehumidification Mode:

The compressor 2 discharges a high-temperature and high-pressure gaseous refrigerant and enters the interior condenser 3. After the refrigerant is exothermic and liquefied in the interior condenser 3, the refrigerant passes through the interior condenser outlet interface 11010 and enters the first electric valve 13. In this case, the first electric valve 13 is switched to a solenoid valve and is in an open state, and an interface 11-701' of a first inner flow channel 11-7' is maintained in communication with an outlet of the first electric valve 13, that is, the exterior heat exchanger inlet interface 11005. The refrigerant enters the exterior heat exchanger 4 through the connecting line, and the refrigerant flowing out of the exterior heat exchanger 4 passes through the exterior heat exchanger outlet interface 11008 and enters the second electric valve 14 through the connecting line. In this case, the second electric valve 14 maintains the interior evaporator inlet interface 11008 in communication with an outlet 11-101' of the second electric valve 14, and is communicated with an inlet 11-103' of the first electronic expansion valve 17 through the first inner flow channel 11-1'. After throttling-induced pressure reduction by the first electronic expansion valve 17, the refrigerant passes through the interior evaporator inlet interface 11004 and enters the interior evaporator 5 through the connecting pipeline. The refrigerant absorbs heat in the interior evaporator 5 and then cools, circulates the indoor air with the interior evaporator 5 through the blower 8, and the indoor water vapor condenses when passing through the outside of the interior evaporator 5 to achieve the function of dehumidification.

Battery Cooling Mode:

The compressor 2 discharges a high-temperature and high-pressure gaseous refrigerant and enters the interior condenser 3. After the refrigerant is exothermic and liquefied in the interior condenser 3, the refrigerant passes through the interior condenser outlet interface 11010 and enters the first electric valve 13. In this case, the first electric valve 13 is switched to a solenoid valve and is in an open state, and an interface 11-701' of a first inner flow channel 11-7' is maintained in communication with an outlet of the first electric valve 13, that is, the exterior heat exchanger inlet interface 11005. The refrigerant enters the exterior heat exchanger 4 through the connecting line, the refrigerant flowing out of the exterior heat exchanger 4 passes through the exterior heat exchanger outlet interface 11008 and enters the second electric valve 14 through the connecting pipeline, and enters the battery pack heat exchanger 19 after being vaporized through the second electronic expansion valve 18. The low-temperature refrigerant exchanges heat with the water circuit to cool the battery pack.

Mode Enabling Both Air Conditioning Refrigeration and Battery Cooling:

The compressor 2 discharges a high-temperature and high-pressure gaseous refrigerant and enters the interior condenser 3. After the refrigerant is exothermic and liquefied in the interior condenser 3, the refrigerant passes through the interior condenser outlet interface 11010 and enters the first electric valve 13. In this case, the first electric valve 13 is switched to a solenoid valve and is in an open state, and an interface 11-701' of a first inner flow channel 11-7' is maintained in communication with an outlet of the first electric valve 13, that is, the exterior heat exchanger inlet interface 11005. The refrigerant enters the exterior heat exchanger 4 through the connecting line, and the refrigerant flowing out of the exterior heat exchanger 4 passes through the exterior heat exchanger outlet interface 11008 and enters the second electric valve 14 through the connecting line. In this case, the second electric valve 14 maintains the interior evaporator inlet interface 11008 in communication with an outlet 11-101' of the second electric valve 14, and is communicated with an inlet 11-103' of the first electronic expansion valve 17 through the first inner flow channel 11-1'. After throttling-induced pressure reduction by the first electronic expansion valve 17, the refrigerant passes through the interior evaporator inlet interface 11004 and enters the interior evaporator 5 through the connecting pipeline to absorb ambient heat for evaporation. The cooled ambient temperature blows cold air into the member compartment through the blower 8 to achieve cooling. The second electronic expansion valve 18 is opened, the vaporized refrigerant enters the battery pack heat exchanger 19, and the low-temperature refrigerant exchanges heat with the water circuit to cool the battery pack.

A second object of the present disclosure is to provide a thermal management system. The system includes an external heat exchange assembly of the thermal management system and the valve set integrated module in any of the above implementations. The external heat exchange assembly includes multiple of a compressor 2, an interior condenser 3, an exterior heat exchanger 4, an interior evaporator 5, a gas-liquid separator 6, a PTC air heater 7, a blower 8, and a PTC water heater 9.

A third object of the present disclosure is to provide a vehicle, which includes the thermal management system, and can realize all preset thermal management modes of the thermal management system. Details are not described herein again. The implementations of the present disclosure are described in detail above with reference to the accompanying drawings. However, the present disclosure is not limited to the specific details in the foregoing implementations, multiple simple deformations may be made to the technical solution of the present disclosure within a range of the technical concept of the present disclosure, and these simple deformations fall within the protection scope of the present disclosure.

In addition, it should be noted that the specific technical features described in the foregoing specific implementations may be combined in any proper manner in a case without conflict. To avoid unnecessary repetition, various possible combination manners are not described in the present disclosure.

In addition, different implementations of the present disclosure may also be arbitrarily combined without departing from the idea of the present disclosure, and these combinations shall still be regarded as content disclosed in the present disclosure.

What is claimed is:

1. A valve set integrated module, configured for a thermal management system having a plurality of preset thermal management modes, comprising:

a body, provided with a plurality of internal flow channels and a plurality of interfaces configured to communicate the internal flow channels with an external heat exchange assembly of the thermal management system; and a first electric valve and a second electric valve, each arranged on the body and configured to directly communicate at least three of the plurality of the internal flow channels to form a plurality of different thermal management circuits, wherein the first electric valve and the second electric valve are configured to switch between an unblocking/blocking function and a throttling-induced pressure reducing function, wherein the first electric valve and the second electric valve are configured to unblock/block and/or throttle the thermal management circuits to achieve at least one of the plurality of preset thermal management modes.

2. The valve set integrated module according to claim 1, wherein the first electric valve is configured to unblock/block the different thermal management circuits, wherein a first end of the first electric valve is in communication with a compressor interface, and a second end of the first electric valve is selectively communicated with or blocked from an interior heat exchanger inlet interface or an interior condenser inlet interface; and the second electric valve is configured to throttle the different thermal management circuits, wherein a first end of the second electric valve is in communication with a liquid reservoir outlet interface, and a second end of the second electric valve is selectively communicated with or blocked from an interior evaporator inlet interface or an exterior heat exchanger inlet interface.

3. The valve set integrated module according to claim 1, further comprising a one-way valve arranged on the body, an inlet of the one-way valve being in communication with an exterior heat exchanger inlet interface, and an outlet of the one-way valve being in communication with the second electric valve.

4. The valve set integrated module according to claim 2, further comprising a one-way valve arranged on the body, an inlet of the one-way valve being in communication with the exterior heat exchanger inlet interface, and an outlet of the one-way valve being in communication with the second electric valve.

5. The valve set integrated module according to claim 1, further comprising a first solenoid valve arranged on the body, a first end of the first solenoid valve being in communication with an exterior heat exchanger outlet interface, and a second end of the first solenoid valve being in communication with a gas-liquid separator inlet interface.

6. The valve set integrated module according to claim 2, further comprising a first solenoid valve arranged on the body, a first end of the first solenoid valve being in communication with an exterior heat exchanger outlet interface, and a second end of the first solenoid valve being in communication with a gas-liquid separator inlet interface.

7. The valve set integrated module according to claim 3, further comprising a first solenoid valve arranged on the body, a first end of the first solenoid valve being in communication with an exterior heat exchanger outlet interface, and a second end of the first solenoid valve being in communication with a gas-liquid separator inlet interface.

8. The valve set integrated module according to claim 1, wherein the first electric valve is configured to unblock/block and throttle different thermal management circuits, wherein a first end of the first electric valve is in communication with an interior condenser outlet interface, and a second end of the first electric valve is in communication with an exterior heat exchanger inlet interface; and the second electric valve is configured to unblock/block the different thermal management circuits, wherein a first end of the second electric valve is in communication with the exterior heat exchanger outlet interface, and a second end of the second electric valve is selectively communicated with an interior evaporator inlet interface or a gas-liquid separator inlet interface.

9. The valve set integrated module according to claim 1, further comprising a first electronic expansion valve arranged on the body, a first end of the first electronic expansion valve being in communication with the second electric valve; and a second end of the first electronic expansion valve being in communication with an interior evaporator inlet interface.

10. The valve set integrated module according to claim 1, further comprising a second solenoid valve arranged on the body, a first end of the second solenoid valve being in communication between an interior condenser outlet interface and the first electric valve through a pipeline, and a second end of the second solenoid valve being in communication between the second electric valve and a first electronic expansion valve through the pipeline.

11. The valve set integrated module according to claim 1, further comprising a second electronic expansion valve arranged on the body, a first end of the second electronic expansion valve being in communication with an exterior heat exchanger outlet interface, and a second end of the second electronic expansion valve being in communication with a battery pack heat exchanger inlet interface arranged on the body.

12. The valve set integrated module according to claim 1, further comprising a battery pack heat exchanger arranged on the body, an inlet of the battery pack heat exchanger being in communication with a battery pack heat exchanger inlet interface, and an outlet of the battery pack heat exchanger being connected with a gas-liquid separator.

13. A thermal management system, comprising an external heat exchange assembly of the thermal management system and the valve set integrated module according to claim 1, the external heat exchange assembly comprising a plurality of a compressor, an interior condenser, an exterior heat exchanger, an interior evaporator, a gas-liquid separator, a PTC air heater, a blower, and a PTC water heater.

14. A vehicle, comprising the thermal management system according to claim 13.

15. The valve set integrated module according to claim 2, further comprising a one-way valve arranged on the body, an inlet of the one-way valve being in communication with the exterior heat exchanger inlet interface, and an outlet of the one-way valve being in communication with the second electric valve.

16. The valve set integrated module according to claim 15, further comprising a first solenoid valve arranged on the body, a first end of the first solenoid valve being in communication with an exterior heat exchanger outlet interface, and a second end of the first solenoid valve being in communication with a gas-liquid separator inlet interface.

17. The valve set integrated module according to claim 16, wherein the first electric valve is configured to unblock/block and throttle different thermal management circuits, wherein a first end of the first electric valve is in communication with an interior condenser outlet interface, and a second end of the first electric valve is in communication with the exterior heat exchanger inlet interface; and the second electric valve is configured to unblock/block the different thermal management circuits, wherein a first end of the second electric valve is in communication with the exterior heat exchanger outlet interface, and a second end of the second electric valve is selectively communicated with the interior evaporator inlet interface or the gas-liquid separator inlet interface.

18. The valve set integrated module according to claim 17, further comprising a first electronic expansion valve arranged on the body, a first end of the first electronic expansion valve being in communication with the second electric valve; and a second end of the first electronic expansion valve being in communication with the interior evaporator inlet interface.

19. The valve set integrated module according to claim 18, further comprising a second solenoid valve arranged on the body, a first end of the second solenoid valve being in communication between the interior condenser outlet interface and the first electric valve through a pipeline, and a second end of the second solenoid valve being in communication between the second electric valve and the first electronic expansion valve through the pipeline.

20. The valve set integrated module according to claim 19, further comprising a second electronic expansion valve arranged on the body, a first end of the second electronic expansion valve being in communication with the exterior heat exchanger outlet interface, and a second end of the second electronic expansion valve being in communication with a battery pack heat exchanger inlet interface arranged on the body.

* * * * *